United States Patent [19]

Thomas et al.

[11] 4,174,244
[45] Nov. 13, 1979

[54] METHOD OF MAKING A PRINTING BLANKET

[75] Inventors: Eric W. Thomas; Thomas J. Maistros, both of Stow, Ohio

[73] Assignee: Industrial Electronic Rubber Company, Twinsburg, Ohio

[21] Appl. No.: 820,845

[22] Filed: Aug. 1, 1977

Related U.S. Application Data

[63] Continuation of Ser. No. 690,856, May 28, 1976, abandoned.

[51] Int. Cl.² ............................................. B29C 3/00
[52] U.S. Cl. .................................. 156/242; 428/250; 428/310; 428/320; 428/909
[58] Field of Search ............... 156/242, 245, 228, 333; 428/240, 248, 250, 304, 310, 315, 317, 320, 909; 264/45.1, 45.8, 46.4, 46.8

[56] References Cited

U.S. PATENT DOCUMENTS

| | | | |
|---|---|---|---|
| 1,398,147 | 11/1921 | Ninotny | 428/909 |
| 2,792,321 | 5/1957 | Fredericks | 428/248 |
| 3,143,457 | 8/1964 | Morris | 428/248 |
| 3,186,894 | 6/1965 | Liles et al. | 428/909 |
| 3,235,772 | 2/1966 | Gurin | 428/909 |
| 3,519,527 | 7/1970 | Crowley | 428/320 |
| 3,700,541 | 10/1972 | Shrimpton et al. | 428/909 |
| 3,795,568 | 3/1974 | Rhodarmer et al. | 428/240 |
| 3,881,045 | 4/1975 | Strunk | 428/250 |

FOREIGN PATENT DOCUMENTS

| | | | |
|---|---|---|---|
| 636007 | 2/1962 | Canada | 428/909 |
| 2025547 | 12/1971 | Fed. Rep. of Germany | 428/909 |

*Primary Examiner*—Caleb Weston
*Attorney, Agent, or Firm*—Maky, Renner, Otto & Boisselle

[57] ABSTRACT

The present invention provides an improvement in the manufacture of laminates containing a rubber surface and particularly to a method of preparing printing blankets for the printing industry wherein the top or printing layer comprises a substantially void-free fluoroelastomer. The improved method of preparing the printing blankets of the invention comprises preparing a composite of a fibrous or pressure sensitive adhesive backing material; a layer of a foamable and cross-linkable elastomeric material over the backing material; a second fibrous materil over the layer of foamable material; a top layer of a non-foamable cross-linkable elastomeric material over said second layer of fibrous material; and molding the composite at an elevated temperature under pressure. The improved process of the present invention provides a compressible printing blanket having a top layer surface which not only is substantially void free but also is substantially free of surface irregularities.

12 Claims, 1 Drawing Figure

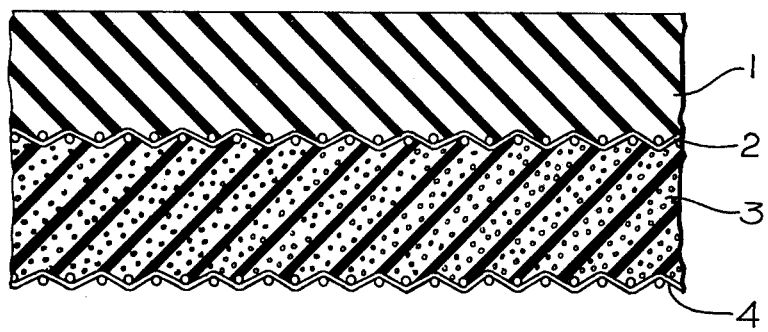

METHOD OF MAKING A PRINTING BLANKET

This is a continuation of application Ser. No. 690,856, filed May 28, 1976, now abandoned.

BACKGROUND OF THE INVENTION

This invention relates to laminates containing a rubber surface and in particular to laminates which are useful as printing blankets for the printing industry. The invention also relates to a method of preparing such laminates which are of the compressible variety.

The use of blankets in offset printing for transferring the ink from a printing plate to the paper is well known. Printing blankets must be carefully designed so that the surface of the blanket is not damaged either by the mechanical contact with the parts of the press or by chemical reaction with the ink or ink ingredients. These repeated contacts cause a certain amount of compression of the blanket which must be within proper limits so that the image is properly transferred without causing permanent deformation of the blanket. An important feature of offset printing blankets, therefore, is the ability of the blanket to return to its original thickness upon repeated use and to provide constant image transfer.

In addition to the problems caused by variations of the printing apparatus, conventional printing blankets may contain variations in thicknesses which are formed during the manufacturing steps. The existence of high or low spots in blankets may create uneven reproductions on the finished product.

The printing blankets which are currently used in the industry generally comprise a base material which provides integrity on the blanket and a working surface or top layer of an elastomeric material made of natural or synthetic rubber. The base material may comprise one or more fabric plies and a layer of a soft highly resilient rubber backing layer. The working surface is a void-free layer of elastomeric material which actually contacts the ink.

The usual method for applying the working layer of elastomeric material to the laminate is by calendering or spreading rubber in successive thin layers until a desired thickness of rubber has been deposited. The assembly then is cured to provide the finished blanket. Such blankets are acceptable but often lack the necessary compressibility or compression set characteristics required in many applications. Moreover, the spreading of successive thin layers of rubber to form the top coat is tedious and often results in surface irregularities which cannot be completely removed by surface treatments such as grinding.

Although blankets have been manufactured with improved compression set characteristics through the use of special plasticizers, textile fibers, foam backing, etc., ideal results have not been obtained because of problems such as uneven compressibility of the surface coating resulting from nonuniform closed cell structure in the backing. Also, backing materials containing cell structures formed by blowing processes have not always contained uniform cellular structures.

The problem with the quality of the printing obtained through the use of the known printing blankets has been magnified by the recent developments in printing technology such as by the design and introduction of very large presses running at ever-increasing speed and new developments in inks and paper.

U.S. Pat. No. 3,795,568 describes a typical procedure which has been used for preparing printing blankets. The normal procedure involves the formation of the laminate by successive formation of the various layers. For example, two plies of fabric are bonded together by a neoprene cement and placed upon a conventional blanket manufacturing machine. A compressible intermediate layer is formed on the second fabric ply by spreading a mixture of a rubber compound, solvent and foam rubber particles onto the fabric and exposing the mixture to an elevated temperature to remove the solvent. A third adhesive coated fabric ply is placed over the spread layer and the assembly is passed through a spreading machine where layers of rubber are applied to the surface by repeated steps until a layer of about 0.01 inch is built up. The assembly then is cured at an elevated temperature.

Printing blankets which have been used in the past have exhibited moderate resistance to the vehicles used in the inks. The blankets have not been easy to clean, swell considerably after extended cleaning, and are not impervious to ozone attack.

Thus, there continues to be a need in the printing industry for a printing blanket which overcomes these problems and deficiencies without a compromise in the desirable and necessary properties of printability, ink release and dimensional stability.

SUMMARY OF THE INVENTION

The present invention provides an improvement in the manufacture of printing blankets particularly suitable for offset printing and an improvement in the blankets themselves. The improvements are obtained by preparing a composite of the various plies of material desired to be incorporated into the printing blanket and thereafter subjecting the composite to molding pressures at elevated temperatures. More particularly, the composite comprises (1) a fibrous or pressure sensitive adhesive backing material, (2) a layer of a foamable and cross-linkable elastomeric material over the backing material, (3) a second fibrous material over the layer of foamable material, and (4) a top layer of a non-foamable cross-linkable elastomeric material over said second layer of fibrous material. Molding the composite under pressure at an elevated temperature results in vulcanization of both elastomeric layers and chemical foaming of the foamable elastomer in situ. The final molded object has a surface which is substantially free of voids and a finish which is substantially free of surface irregularities. The use of fluoroelastomers as the elastomeric material of the composite provides improved printing blankets characterized by improved dimensional stability, resistance to swelling, printability and cleanability.

BRIEF DESCRIPTION OF THE DRAWING

The FIGURE illustrates one embodiment of the compressible printing blanket of the present invention which comprises an elastomeric top surface printing layer 1, an intermediate layer of a fibrous material 2, a layer of a foamed elastomeric material 3 and a backing layer of a fibrous material 4.

DESCRIPTION OF THE PREFERRED EMBODIMENTS

It has now been found that printing blankets for offset printing can be prepared by a molding technique which provides for a printing blanket having improved properties, and particularly an improved substantially void-free smooth printing surface. It also has been found that printing blankets having a top printing surface of a fluoroelastomer, and preferably a printing blanket having a top surface of a fluoroelastomer and an intermediate foamed layer of a fluoroelastomer exhibit improved resistance to swelling and image distortion, good ink release and transfer, good printability and improved cleanability after use without glaze buildup.

The process for preparing the improved printing blankets of this invention comprises
(a) preparing a composite of
  (1) a fibrous or pressure sensitive adhesive backing material,
  (2) a layer of foamable and cross-linkable elastomeric material over the backing material,
  (3) a second fibrous material over the layer of foamable material, and
  (4) a top layer of a non-foamable cross-linkable elastomeric material over said second layer of fibrous material, and
(b) molding the composite at an elevated temperature under pressure.

The conditions for molding the composite, such as the temperature, pressure and time of molding will vary depending upon the particular elastomeric composition selected for the top layer and the intermediate foamable layer since curing and foaming occur while the composite is molded.

The preparation of the composite is effected by sheeting out a layer of the foamable and cross-linkable elastomeric material on the backing material followed by applying the second fibrous material on top of the foamable layer, and finally applying or sheeting out a top layer of the non-foamable cross-linkable elastomeric material which is to form the top layer with a printing surface.

The amounts of foamable or non-foamable cross-linkable elastomeric materials utilized for the top layer and the intermediate foamable layer will be determined by a consideration of the desired characteristics of the printing blanket including the desired thickness and compressibility characteristics of the printing blanket. Generally, printing blankets may be utilized having thicknesses of from about 55 to about 75 mils. The precise thickness of a printing blanket will be determined by its end use and the particular requirements which may be dictated by the end user. The cover layer and intermediate foam layer thicknesses may range from about 5 to about 30 mils or more with the fabric layers making up the difference.

As mentioned above, the cover or top printing layer may comprise any material having rubbery or compressible properties and which will cure and, optionally, foam under the conditions of molding. Examples of elastomeric materials which have been utilized previously as a top printing layer include elastomeric materials having various hardnesses such as can be prepared from a copolymer of acrylonitrile with butadiene, epichlorohydrin rubbers which can be 100% of epichlorohydrin or can contain up to about 50% of ethylene oxide, polyurethane elastomers, acrylonitrile/epichlorohydrin elastomers, polysulfide rubbers and fluoroelastomers. The fluoroelastomers include elastomers such as fluorosilicones and fluorocarbons with the fluorocarbons being preferred.

Among the fluorocarbons which can be utilized in the preparation of the printing blankets of this invention are those which are commercially available from a variety of sources under such trade names as "Vitron" (E. I. duPont de Nemours and Company) and "Fluorel" available from the Minnesota Mining and Manufacturing Company. Elastomers available under these two trade names are highly fluorinated synthetic rubbers which generally consist essentially of a polymeric compound containing a major portion of units of hexafluoropropylene and vinylidene fluoride. Copolymers of these monomers containing 30 to 60% by weight of hexafluoropropylene monomer and 70 to 40% by weight of vinylidene fluoride monomer are useful. Terpolymers thereof with tetrafluoroethylene in which there is from about 65 to 97% by weight of units of hexafluoropropylene and vinylidene fluoride also can be utilized.

The elastomeric material utilized as the top printing layer also can be utilized as the intermediate foamed layer of the printing blanket although it is not essential that the elastomeric material utilized in the top layer be identical to the material used in the foam layer. It is preferred, however, that fluoroelastomers be utilized as the top layer and the reinforcing foam layer since these materials exhibit excellent cleanability and solvent resistance.

The elastomeric formulations utilized for the preparation of the top printing layer and the intermediate foam layer will contain the usual additives such as acid acceptors, fillers, pigments, antioxidants, processing aids, cross-linking agents, etc., and the formulation for the foamable elastomer also will contain blowing agents normally utilized in conjunction with the particular elastomer. Acid acceptors which may be utilized include materials such as zinc oxide, magnesium oxide, lead oxide, and calcium oxide. Magnesium oxide is preferred. Fillers include a variety of materials such as mineral fillers including calcium carbonate, calcium silicate, silica, etc. Pigments such as carbon black, titanium dioxide, zinc oxide, various dyes and read lead may be included to provide a desired color to the elastomeric layers.

A variety of processing aids are well known in the elastomer art and the particular processing aids to be included in the elastomeric compositions depend on the nature of the elastomer. Processing aids are utilized in the present invention to improve mixing and mold release. Examples of processing aids include plasticizers and other materials which can be utilized to control the viscosity of the formulation such as polyethylene, carnauba wax, stearic acid, dibasic lead phosphate, etc.

The cross-linking agents to be utilized with particular elastomers are well known in the art. Among the cross-linking agents preferred in this invention for fluoroelastomers are the various peroxides and diamines such as ethylene diamine carbamate, hexamethylene diamine carbamate, benzoyl peroxide, dicumyl peroxide, etc. The preferred blowing agents for the fluoroelastomers utilized in the formation of the foamed layer include the blowing agent available under the general trade designation "Celogen" available from the Naugatuck Chemical Company and "Kempore" available from National Polychemicals Company. Specific examples include "Celogen OT" which has been identified as principally p,p'-oxy-bis(benzene sulfonyl) hydrazide and "Kempore 200" which is believed to be azo-dicarbonamide.

Thus, the elastomeric materials utilized in the formulation of the top layer and the intermediate foamed layer will comprise generally:

|                      | Parts by Weight |
|----------------------|-----------------|
| Elastomer            | 100.0           |
| Acid acceptors       | 1-20            |
| Fillers and pigments | 0-60            |
| Processing aids      | 0-20            |
| Cross-linking agent  | 1-10            |
| Blowing agents       | 0-5             |

The several ingredients are mixed until homogeneous and sheeted out to the desired thickness.

In addition to the two layers of elastomeric material, the printing blankets of the invention contain a layer of backing material which may be either a fibrous material or a pressure sensitive adhesive although fibrous materials are preferred. Woven as well as non-woven fabrics can be utilized as the fibrous backing material. The printing blankets of the invention also contain an intermediate layer of a second fibrous material, and this fibrous material may be the same as or different from the fibrous material of the backing layer. Typically, twills, drills, ducks and other types of weaves of natural fibers such as cotton or synthetic fibers such as rayon are utilized as the backing material and the second fibrous material. Other synthetic fibers such as nylon, polyesters, polypropylene or blends of fibers also can be utilized. Non-woven spun bonded fabrics of polyester or polyolefins such as polyethylene can be utilized as the backing material.

For some printing applications, a pressure sensitive adhesive may be utilized as the backing in place of the fibrous backing. Typical pressure sensitive adhesives that can be utilized are those based on natural or synthetic elastomers modified with various resins and other compounding agents. These pressure sensitive adhesives can be applied as a latex or in a solvent or the foamable and cross-linkable elastomeric material can be applied over the adhesive contained on a release paper.

Cements or adhesives are not required for the formation of the printing blankets of this invention since the composites are prepared utilizing uncured elastomeric materials which form tight bonds with the fibrous material or adhesive backing material when cross-linked or cured under pressure at elevated temperatures. An important result which is obtained by the method of this invention is that the elastomeric layers, and particularly the foamed elastomeric layer partially fills the interstices of the base and intermediate layers of fibrous materials. The presence of the foamed elastomeric layer in the interstices of the backing layer results in a high degree of adhesion of the printing blanket to the printing cylinder upon which it is mounted, and this reduces the possibility of the printing blanket slipping on the printing cylinder during operation.

After the composite described above is prepared, it is molded under pressure such as between steel plates or in a calender. Molding temperatures between about 125° to about 225° C. or higher and pressures of from about one to about 500 pounds per square inch may be utilized. The duration of the molding operation will vary but generally can be effected in a period between about one to 20 minutes.

During the molding operation, any entrapped air is removed while vulcanization or cross-lnking and chemical foaming takes place in situ. The final molded object has a top surface substantially free of voids and a finish which replicates that of the steel plate or the calender. The foamed intermediate layer contains a multitude of individual closed cells.

The following example illustrates the method of this invention utilizing a fluorocarbon as the elastomer of the top printing layer and the foamed intermediate layer. Unless otherwise indicated, all parts and percentages are by weight. The elastomeric materials are compounded in accordance with standard procedures published for compounding fluoroelastomers on a rubber mill.

| Formulation - Top Printing Layer | Parts by Weight |
|---|---|
| Viton E-60C (a fluoroelastomer available from DuPont and having a Shore "A" durometer hardness when cured of about 60 to 95) | 75 |
| Viton LD 3193-90 (a fluoroelastomeric copolymer available from DuPont) | 25 |
| Calcium Carbonate | 35 |
| Precipitated Silica (5 micron) | 5 |
| Titanium Dioxide | 5 |
| Magnesium Oxide | 3 |
| Polyethylene (Natrocel PE) | 2 |
| Vanfre AP-2 (processing aid from Vanderbilt Co.) | 2 |
| Monastral Blue | 0.5 |
| Calcium Hydroxide | 3.0 |

| Formulation of Foamable Elastomer | Parts by Weight |
|---|---|
| Viton A (copolymer of hexafluoropropene and vinylidene fluoride, available from DuPont) | 50 |
| Viton E-60C | 37.5 |
| Viton LD 3193-90 | 12.5 |
| Zinc Oxide | 4.0 |
| Dibasic Lead Phosphite ("diphos") | 4.0 |
| Calcium Carbonate | 23.5 |
| Precipitated Silica (5 micron) | 2.5 |
| Titanium Dioxide | 2.5 |
| Medium Thermal Black | 4.0 |
| Magnesium Oxide (Maglite D from Merck & Company) | 1.5 |
| Kempore 200 | 1.0 |
| Vaseline | 2.5 |
| Hexamethylenediamine Carbamate (Diak No. 1) | 1.2 |
| Calcium Hydroxide | 1.5 |

The base fabric utilized in this example is a double warp wigan cotton duck, 15 mil, six ounces per square yard fabric. The foamable elastomeric formulation described above is sheeted onto the base fabric to provide an elastomeric layer thickness of about 15-17 mils. Over the foamable material is placed a second layer of double warp wigan cotton duck fabric of about 11 mils thickness and weighing approximately five ounces per square yard. The top layer elastomeric material described above then is sheeted on top of the second fabric to a thickness of about 15-17 mils.

The composite prepared in this manner then is molded between steel plates at a temperature between about 150° C. and 200° C. under a pressure of about 110 psi for a period of about five minutes. During this molding operation, entrapped air escapes from the four sides of the composite while vulcanization and chemical foaming takes place in situ. The printing blanket prepared in accordance with this example has a surface which is substantially free of voids and a finish which replicates that of the steel plate. The foam layer is characterized by a multitude of individual closed cells.

The novel printing blankets of this invention exhibit the following properties:
1. They are compressible in design which minimizes heat buildup;
2. They are highly resistant to swelling and image distortion from inks and cleaning solvents;
3. They exhibit excellent resistance to ozone attack such as found in ultra-violet dryers;
4. They are easily cleaned in a wash bath without glaze buildup;
5. They exhibit good ink release and transfer;
6. They exhibit good printability and mechanical strength.

The embodiments of this invention in which an exclusive property or privilege is claimed are defined as follows:

1. A process for preparing a printing blanket useful for offset printing which comprises
   (a) preparing a composite by
      (1) sheeting out a layer of a foamable and cross-linkable elastomeric material over a fibrous or pressure sensitive adhesive backing material,
      (2) applying an intermediate layer of fibrous material over a layer of foamable material, and
      (3) sheeting out a top layer of a non-foamable cross-linkable elastomeric material over said intermediate layer of fibrous material, and
   (b) molding the composite at an elevated temperature under pressure whereby both layers of elastomeric material are cross-linked in situ and the foamable elastomeric material is foamed in situ.

2. The process of claim 1 wherein the fibrous backing material is a woven or non-woven fabric.

3. The process of claim 1 wherein the composite is molded at a temperature between about 125° to about 225° C. for a period of from about one to about 20 minutes.

4. The processs of claim 3 wherein the composite is molded between steel plates at a pressure of between about one to about 500 psi.

5. The process of claim 1 wherein the elastomeric material of the top layer is a fluoroelastomer.

6. The process of claim 5 wherein the foamable elastomeric material is a fluoroelastomer.

7. The process of claim 5 wherein the fluoroelastomer is a fluorocarbon.

8. The process of claim 5 wherein the fluoroelastomer is a polymer containing a major portion of hexafluoropropylene and vinylidene fluoride.

9. A process for preparing a compressible printing blanket for offset printing which comprises
   (a) preparing a composite by
      (1) sheeting out a layer of a foamable and cross-linkable fluoroelastomeric material over a fibrous backing material,
      (2) applying an intermediate layer of fibrous material over the layer of foamable elastomeric material, and
      (3) sheeting out a top layer of non-foaming cross-linkable fluoroelastomeric material over said intermediate layer of fibrous material, and
   (b) molding the composite under a pressure of from one to about 500 psi at a temperature of from about 150° C. to about 200° C. for a period of from about one to 20 minutes whereby both layers of elastomeric material are cross-linked in situ and the foamable elastomeric material is foamed in situ.

10. The process of claim 9 wherein the fluoroelastomer in the top layer is a copolymer of hexafluoropropylene and vinylidene fluoride and is from about five to about 30 mils in thickness.

11. The process of claim 9 wherein the fluoroelastomer in the top layer is a fluorocarbon polymer.

12. The process of claim 11 wherein the foamable and cross-linkable fluoroelastomeric material is a copolymer of hexafluoropropylene and vinylidene fluoride.